Feb. 4, 1969  E. J. NUNLIST ET AL  3,425,582

JACKETED VESSEL

Filed Nov. 7, 1966

INVENTORS.
ERWIN J. NUNLIST
ALEX PRIMAK
BY
ATTORNEY

United States Patent Office 3,425,582
Patented Feb. 4, 1969

3,425,582
JACKETED VESSEL
Erwin J. Nunlist and Alex Primak, Penfield, N.Y., assignors to Ritter Pfaudler Corporation, Rochester, N.Y., a corporation of New York
Filed Nov. 7, 1966, Ser. No. 592,429
U.S. Cl. 220—14          4 Claims
Int. Cl. B65d 7/22, 7/40, 23/02

ABSTRACT OF THE DISCLOSURE

A jacketed vessel includes a stiffening ring which is fixed adjacent the connection of the jacket sealer and jacket to prevent inward and outward deflection of the jacket sealer, and a relatively flexible jacket diaphragm member connecting the jacket directly to the discharge nozzle.

---

This invention relates generally to an improved jacketed reactor vessel. More specifically, the present invention relates to an improved jacket sealer in combination with a flexible jacket diaphragm for use in relatively large glass-lined reactor vessels.

Glass-lined reactor vessels having one or more top located charging inlets and a bottom located discharge nozzle are commonly used by a wide variety of industries. For example, because of the corrosion resistance and acid-resistance properties of glass, such vessels are used by chemical industries to contain highly corrosive reactants. In the food processing industries, foods are processed in glass-lined vessels because such vessels are easily sterilized and the glass lining does not affect the flavor of the food.

If the process taking place within the vessel requires a heat transfer, either heating or cooling, it is common to have an outer jacket substantially surrounding the reactor vessel. Within this jacket and in contact with the reactor vessel, a heated or cooled fluid or steam is circulated under pressure for the purpose of heating or cooling the contents of the reactor vessel.

When constructing a glass-lined reactor vessel, an outward extending flange known in the art as a jacket sealer is welded to the reactor tank adjacent its top prior to the glassing operation. In the same manner, a cylindrical-shaped element known in the art as a jacket collar is then welded to the bottom of the reactor tank surrounding the discharge nozzle of the tank. The interior of the tank is then covered with a glass frit which is fired to bond the glass to the tank. After glassing, the jacket is placed about the reactor tank. The top of the jacket is then welded to the jacket sealer and the bottom of the jacket, often a separate member known in the art as a jacket diaphragm, is welded to the jacket collar. In this type of construction, the jacket sealer and jacket collar support the jacket about the reactor tank.

In constructing a glass-lined jacketed vessel, the jacket sealer and collar must be attached to the reactor tank before glassing because otherwise the heat of welding would fracture the glass lining. The jacket and jacket diaphragm must be attached to the jacket sealer and collar, respectively, after glassing because otherwise the jacket and diaphragm would shield portions of the reactor vessel during the firing of the glass frit causing an uneven temperature distribution during the glassing process and inhibiting the formation of a stable glass to metal bond.

When in use, the jacketed reactor vessel is supported in an upright position by legs or lugs attached to the jacket and the glass-lined reactor tank is held suspended within the jacket by the jacket sealer and jacket collar. With the jacketed reactor vessel in this position, steam or other fluid under pressure introduced into the space between the reactor tank and jacket exerts forces which tend to separate the jacket from the reactor tank. In large vessels these separating forces become very great even if a relatively low pressured fluid is used.

Prior to the present invention, the jacket sealer, collar and diaphragm had to be relatively rigid as all three members co-acted to prevent separation of the reactor tank and outer jacket. It was found that if the jacket collar were eliminated and the jacket diaphragm rigidly joined directly to the discharge nozzle, excessive forces would be exerted on the nozzle neck due to fluid pressure in the jacket and thermal expansion differentials between the jacket and the reatcor tank. These excessive forces could in turn cause a failure of the nozzle or fracture of the glass lining adjacent the nozzle. Accordingly, the prior art teaches that the jacket diaphragm has to be attached to the jacket collar which in turn is located about and radially spaced from the discharge nozzle. However, having the jacket terminate at some distance from the discharge nozzle creates certain other drawbacks. With such a construction, part of the bottom of the reactor tank is not exposed to the heating or cooling fluid in the jacket and that portion of the reactor tank around the discharge nozzle changes temperature only according to the ambient conditions and temperatures within the reactor tank. This temperature discontinuity causes stress build-up and possible glass failure in the area adjacent the discharge nozzle.

The jacket sealer is similar to a downward sloping cantilever beam. Thus, the forces which act to separate the jacket from the reactor tank cause stress in the jacket sealer which in turn tends to bend or deform the sealer. Any deformation of the jacket sealer results in deformation of the reactor tank at the point of jacket sealer attachment. Deformations of the reactor tank in turn often result in fracture of the glass lining at a point opposite the point of jacket sealer attachment. Merely altering the size of the jacket sealer to make it able to withstand the stresses of heat and pressure creates certain reactor fabrication and operation problems which are not easily ovrecome. Making the jacket sealer shorter, for example, to reduce cantilever effects also reduces the space available between tank wall and jacket for circulation of a fluid medium. Increasing jacket sealer thickness to increase its strength causes the sealer to heat and cool slower than the thinner walled reactor tank and results in tank distortion and glass fracture during or immediately after firing. Increasing the downward slope of the jacket sealer to a near vertical position causes undue shielding of the reactor tank during the firing cycle which prevents the formation of a uniform and sound glass coating. To prevent jacket sealer deformation by providing spoke-like structures that extend between the reactor tank and jacket wall has also proven unsuitable as such spokes transmit forces directly to the tank wall causing distortion and glass fracture.

In the jacketed reactor vessel of the present invention, the jacket sealer is constructed in a manner which enables the sealer to carry all of the forces acting to separate the jacket from the reactor tank without entailing any of the operation or fabrication problems set out above. Making the jacket sealer strong enough to carry all the separating forces eliminates the need for a jacket collar and permits the use of a flexible jacket diaphragm to join the jacket directly to the discharge nozzle. This construction allows the fluid medium in the jacket to circulate about the entire base of the reactor tank without incurring the disadvantages of a rigid, direct diaphragm connection as set out above.

Accordingly, it is an object of our invention to provide a relatively large glass-lined jacketed reactor vessel employing a new and improved high strength jacket sealer.

Another object of our invention is to provide a jacketed vessel having a jacket sealer which is able to withstand the stresses produced by heat and pressure without substantial deformation.

Still another object of our invention is to provide a jacketed vessel having a jacket sealer which has lower combined stresses than a sealer of conventional design with the same material thickness.

A further object of our invention is to provide a jacketed reactor vessel in which the entire bottom of the reactor tank is exposed to the fluid medium circulating within the jacket.

A still further object of our invention is to provide a jacketed vessel having a flexible relatively stress free jacket diaphragm.

A jacketed vessel constructed in accordance with our invention is characterized in one aspect thereof by the provision of an inner glass-lined reactor tank having an inlet and a discharge nozzle, a jacket sealer attached to the reactor tank, the jacket sealer having generally the shape of a truncated cone, a stiffening ring fixed about the base periphery of the jacket sealer, a jacket carried about the outer periphery of the stiffening ring and a relatively flexible jacket diaphragm member connecting the jacket to the discharge nozzle.

These and other objects, advantages and characterizing features of our invention will become more apparent upon consideration of the following detailed description thereof, in conjunction with the accompanying drawings depicting the same, in which.

Figure 1:
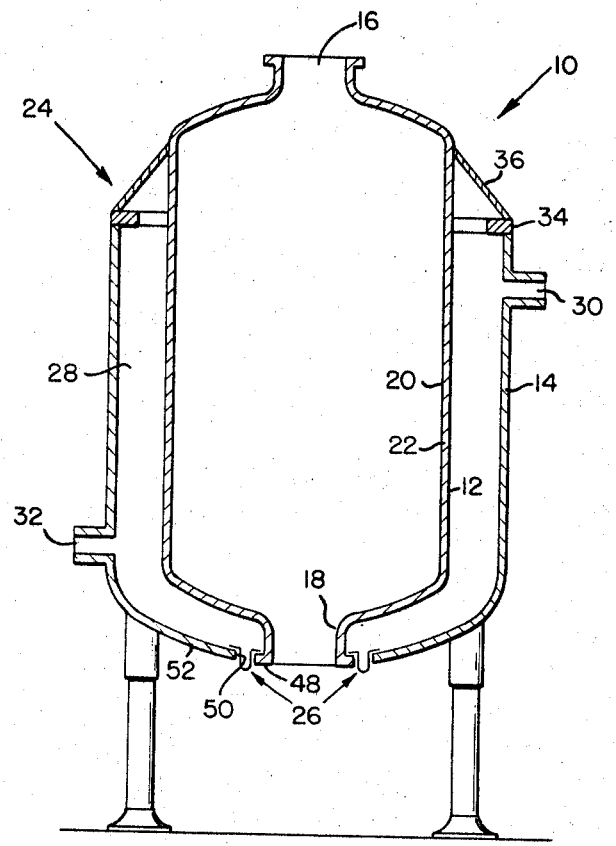
FIGURE 1 is a schematic representation of a glass-lined jacketed vessel of our invention.

Referring now in detail to the drawings, FIGURE 1 shows a jacketed vessel generally designated at 10 having a glass-lined inner reactor tank 12 and an outer jacket 14. Reactor tank 12 includes at least one top located charging inlet 16 and a bottom located flanged discharge nozzle 18. The side wall, top and bottom heads of reactor tank 12 comprise a glass lining 20 bonded to a metallic shell 22. Attaching jacket 14 to reactor tank 12 are a jacket sealer and a jacket diaphragm assembly generally designated at 24 and 26 respectively. The disposition of reactor tank 12 within jacket 14 defines a fluid-tight space 28 about the reactor tank. Extending through jacket 14 to communicate with fluid-tight space 28 are inlet and outlet conduits 30 and 32 respectively, which provide for the circulation of a fluid medium under pressure into space 28 and about reactor tank 12.

Figure 2:
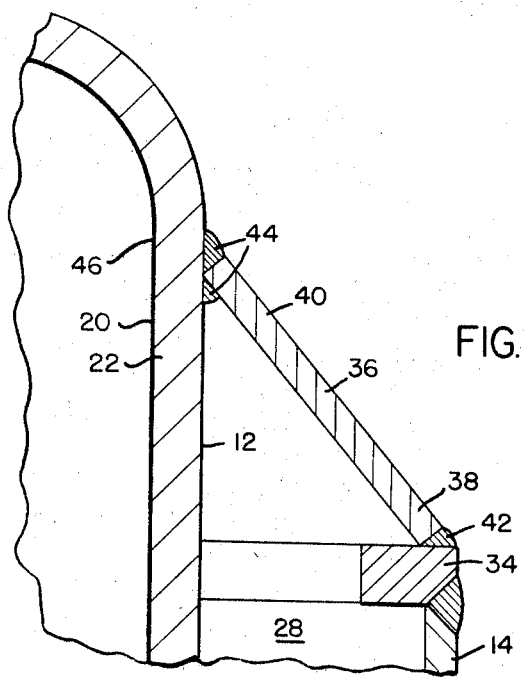
FIGURE 2 is a view of a portion of the jacketed vessel showing the jacket sealer in section.

As shown in FIGURES 1 and 2, jacket sealer 24 is disposed about reactor tank 12 and includes a stiffening element 34 and a connector element 36. Stiffening element 34 is a hoop or otherwise generally ring-shaped member carried atop jacket 14 to provide a base support for connector element 36. The ring-shape of stiffening element 34 prevents any portion of element 34 from physically contacting reactor tank 12. The ring-shape of element 34 also permits it to radially expand or contract slightly for purposes set out herein below.

Connector 36 is generally the shape of a truncated cone, having its base end 38 (FIGURE 2) fixed to stiffening element 34 and its upper end 40 inclined against and fixed to reactor tank 12 by any suitable means such as welds 42 and 44 respectively. We have found that for best results, connector 36 should have a cone angle of between 50°–60° from the horizontal. This angle provides a cone-shaped connector that is relatively stress resistant and which does not cause undue shielding of reactor tank 12 during the firing cycle. Shielding of reactor tank 12 during the firing cycle is also prevented by welding only connector 36 to the tank before firing, the jacket 14 and element 34 being connected after firing. The thickness of connector 36 should be approximately .6 the thickness of the metallic shell 22 to insure that the metallic shell is not unduly constricted by connector 36 during the cooling cycle after firing.

Figure 3:
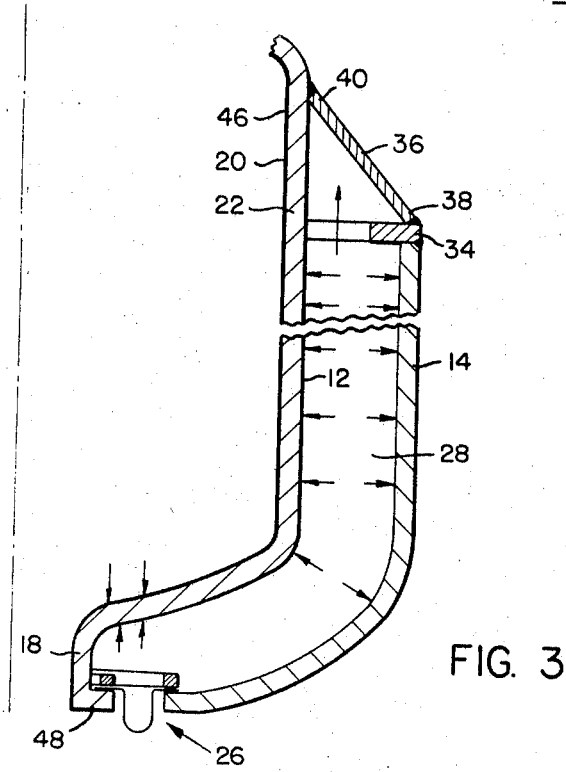
FIGURE 3 is a schematic representation foreshortened and in section, of the jacketed vessel showing the action of forces tending to separate the jacket from the reactor tank.

FIGURE 3 shows a representation of the forces acting on reactor tank 12 and jacket 14. These forces are caused by several factors such as: the weight of inner tank 12 and its contents, the weight and pressure of the fluid medium in fluid space 28 and the strain due to temperature differentials existing between the reactor tank 12 and the outer jacket 14. These forces acting on connector 36 cause the base end 38 of the connector to deflect inward or outword which in turn produces a maximum bending movement at the upper end 40 of the connector. Any excessive build-up or concentration of bending moments adjacent upper end 40 is particularly dangerous as such bending might cause distortion of metallic shell 22 at the point of connector attachment. Distortion of metallic shell 22 will in turn result in a fracture of the glass lining 20 at a point 46 directly opposite welds 44.

As set forth hereinabove, the prior art utilized both a rigid jacket diaphragm and jacket collar to help the jacket sealer carry these connector distorting loads. In the present invention, however, stiffening element 34 is provided to prevent execessive inward or outward deflection of the base end 38 of the connector. This in turn also prevents the formation of relatively large bending moments about the upper end 40 of the connector. The ring shape of stiffening element 34 and its disposition about reactor tank 12 permits the element to resist inward or outward deflection of base end 38 without transmitting a moment directly to reactor tank 12. The shape and disposition of stiffening element 34 also permits it to carry a relatively large force without an excessive radial deformation. In actual practice, spacer 34 does undergo a slight radial contraction or expansion responsive to the inward or outward deflection of base end 38 but such slight deformation can be tolerated as it will not cause the glass lining 20 to fail at point 46. Thus, stiffening element 34 greatly increases the pressure withstanding capabilities of jacket sealer 24 without increasing the size or greatly altering the shape of connector element 36. The jacket sealer 24 of the present invention is now able to carry the entire load acting to separate reactor tank 12 from jacket 14 without assistance of a rigid jacket collar and jacket diaphragm as taught by the prior art.

The jacketed vessel 10 of the present invention is further improved by the provision of a flexible jacket diaphragm assembly 26 which connects the flange 48 of discharge nozzle 18 directly to jacket 14. The flexible nature of jacket diaphragm assembly 26 permits reactor tank 12 and jacket 14 to expand or contract relative to each other without imparting stresses to discharge nozzle 18. Jacket diaphragm assembly 26 further permits the fluid medium in space 28 to circulate about discharge nozzle 18 and under the entire base of reactor tank 12.

Figure 4:
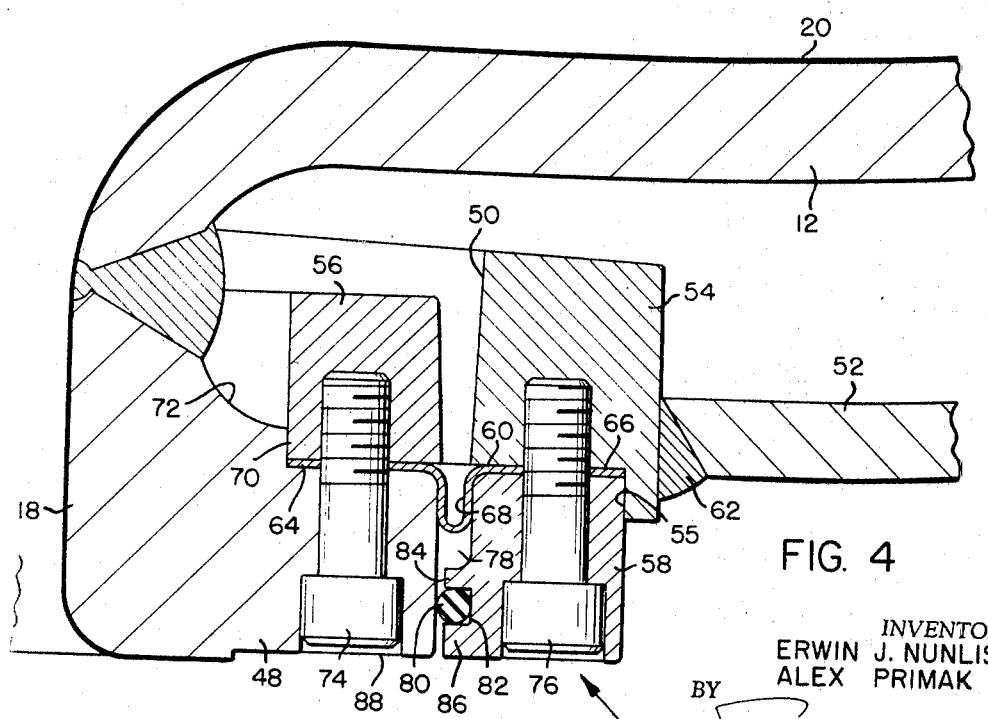
FIGURE 4 is a view in section of the flexible diaphragm attaching the jacket to the discharge nozzle of the reactor vessel.

FIGURE 4 shows the flexible jacket diaphragm assembly 26 to include backing ring 54, a split ring 56, facing ring 58 and a flexible annular diaphragm element 60.

Backing ring 54 is fixed integral jacket 14 by any suitable means, such as weld 62 and is provided with an annular seat 55. The inner diameter of backing ring 54 forms the opening 50 in the jacket base 52 through which discharge nozzle 18 extends. Annular diaphragm element 60 can be made of any suitable flexible material which is impervious and is able to withstand high temperatures and pressures such as a high temperature nylon fabric impregnated with an elastomeric sealant. Annular diaphragm 60 includes an inner peripheral portion 64, and outer peripheral portion 66 and an intermediate portion 68. Since the inside diameter of annular diaphragm 60 is less than the outside diameter of nozzle flange 48 the flexible diaphragm must be stretch fitted over nozzle flange 48. The inner peripheral portion 64 of diaphragm 60 is then rested in an annular seat 70 formed on the rear face 72 of nozzle flange 48. Split ring 56 is then assembled about discharge nozzle 18 and drawn towards nozzle flange 48 by any suitable means such as bolts 74 threaded into split ring 56 through nozzle flange 48. In this manner inner peripheral portion 64 of diaphragm 60 is clamped firmly to nozzle flange 48. The outer peripheral portion 66 is clamped in a similar manner between backing ring 54 and facing ring 58 by bolts 76 threaded to the backing ring through facing ring 58. In the assembled position, the proximity of facing ring 58 to nozzle flange 48 forms an annular space 78 therebetween. As shown in FIGURE 4, intermediate portion 68 of diaphragm 60 forms an open reverse fold; by flexing into space 78. With intermediate diaphragm portion 68 in this position, jacket 14 can move relative to nozzle flange 48 without destroying the fluid tight connection to discharge nozzle 18 since the open reverse fold; can flex to compensate for such jacket motion.

To insure against a sudden loss of the fluid medium in fluid space 28 should diaphragm 60 fail, a back-up O ring 80 is provided as an auxiliary seal. O ring 80 is disposed in an annular groove 82 formed about the inner periphery of facing ring 58. Groove 82 is defined between upper and lower shoulders 84, 86 respectively formed integral facing ring 58. Shoulders 84, 86 are disposed to abut nozzle flange 48 whenever facing ring 58 moves laterally toward nozzle flange 48. In this manner the integrity of annular space 78 is maintained to prevent pinching and possible damage to the intermediate portion 68.

Thus, it will be appreciated that the present invention accomplishes its intended objects, providing both an improved jacket sealer and diaphragm for glass-lined jacket reactor vessels. The jacket sealer 24 of the present invention is able to carry relatively large loads without materially deforming. The increased strength of jacket sealer 24 in turn permits construction of a flexible jacket diaphragm 26 which can couple jacket 14 directly to the discharge nozzle 18 without fear of over-stressing or fracturing the nozzle. Direct coupling of jacket diaphragm 26 to nozzle flange 48 also eliminates the need of a jacket collar. The combination of a high strength jacket sealer and a flexible jacket diaphragm provides for construction of a relatively large reactor vessel in which the entire bottom surface of reactor tank 12 is exposed to the fluid medium in fluid space 28. Furthermore, the high strength of the jacket sealer is achieved while keeping the thickness of connector 36 substantially less than the thickness of metallic shell 22.

While we have described the preferred embodiment of our invention, it will be apaprent that various modifications can be made therein without changing the spirit and scope of the invention as set out in the appended claims. For example, the cross-sectional configuration of stiffening element 34 should not be limited to the generally rectangular cross section shown in FIGURES 1-3 as a stiffening element 34 having a circular cross section would perform equally as well. Also, the invention should not be limited to having stiffening element 34 located between connector 36 and jacket 14 as shown in FIGURES 1-3. Attaching the base end of connector 36 directly to jacket 14 and locating the stiffening element adjacent the point of attachment by either welding element 34 to the connector element or the jacket will allow the stiffening element to prevent inward or outward deflection of base end 38 equally as well. Furthermore, bolts 76 shown in FIGURE 4 could be threaded directly to jacket base 52, thereby clamping outer diaphragm portion 66 directly to the jacket. It also may be desirable to clamp diaphragm 60 to the exposed face 88 of flange 48 rather than to the rear face 72 of the flange.

Although the invention has been illustrated by a particular preferred embodiment, it is to be understood that such disclosure is intended to be illustrative, not limiting, and that various other modifications that will become apparent to those skilled in the art are within the scope of this invention and the appended claims.

We claim:

1. In combination with a process container comprising a reactor tank having a discharge nozzle adjacent the bottom thereof, a jacket disposed about and substantially enclosing the bottom and sides of said reactor tank, said jacket being outwardly spaced from said reactor tank to form a fluid space between said tank and jacket for the circulation of fluid under pressure about said reactor tank, means for connecting said discharge nozzle to said jacket adjacent the bottom of said jacket, and a frustoconical jacket sealer having its uppermost and smaller end attached to said reactor tank and its lowermost and larger end connected to said jacket, a stiffening ring disposed about and radially spaced from said reactor tank, said stiffening ring being carried on the upper edge of said jacket and attached to said larger end of said jacket sealer to resist radial inward and outward deflection of said jacket sealer end caused by said pressurized fluid.

2. In a jacketed vessel comprising a reactor tank having a discharge nozzle adjacent the bottom thereof, a jacket disposed about and substantially enclosing the sides and bottom of said reactor tank, said jacket being outwardly spaced from said reactor tank to form a fluid space between said tank and jacket for the circulation of fluid under pressure about said reactor tank, and a frustoconical jacket sealer having its uppermost and smaller end attached to said reactor tank and its lowermost and larger end connected to said jacket, (a) a relatively stress-free diaphragm assembly having a first annular member formed integral said jacket and disposed about said nozzle, a second annular member adapted for face-to-face releasable connection to the lower face of said first member, said second member surrounding and spaced from said nozzle to form an annular space between the nozzle and said second member;

(b) an annular flexible, impervious element fixed adjacent the outer periphery thereof, between said first and second members and connected adjacent the inner periphery thereof to said discharge nozzle to provide a fluid tight connection between said jacket and said nozzle; and (c) auxiliary sealing means carried by said second annular member for maintaining said fluid tight connection upon rupture of said annular, flexible impervious element.

3. An improved jacketed vessel as set forth in claim 2 in which said flexible impervious element comprises:

(a) an outer peripheral portion clamped between said first and second annular members;

(b) an inner peripheral portion clamped to said nozzle; and (c) an unrestrained intermediate portion forming a reverse fold extending into said annular space, said reverse fold adapted to deform upon relative movements of said jacket and said nozzle to maintain said fluid tight connection.

4. An improved jacketed vessel as set forth in claim 3 in which said second annular member has a radially inward projecting shoulder for maintaining the integrity of said annular space to keep said reverse fold from being pinched between said second annular member and said nozzle.

References Cited

UNITED STATES PATENTS

| | | | |
|---|---|---|---|
| 1,392,204 | 9/1921 | Nichols | 220—14 |
| 2,185,026 | 12/1939 | Goecke | 220—13 X |
| 2,391,876 | 1/1946 | Brown | 220—13 X |
| 2,401,606 | 6/1946 | Brown | 220—15 X |
| 3,037,657 | 6/1962 | Hampton et al. | 220—15 |

FOREIGN PATENTS

| | | |
|---|---|---|
| 487,466 | 12/1929 | Germany. |
| 505,961 | 5/1939 | Great Britain. |

THERON E. CONDON, *Primary Examiner.*

JAMES R. GARRETT, *Assistant Examiner.*

U.S. Cl. X.R.

220—13